United States Patent [19]

Wada

[11] Patent Number: 4,497,203

[45] Date of Patent: Feb. 5, 1985

[54] APPARATUS FOR MEASURING FLOW VELOCITY

[75] Inventor: Shunichi Wada, Hyogo, Japan

[73] Assignee: Mitsubishi Denki Kabushiki Kaisha, Tokyo, Japan

[21] Appl. No.: 449,618

[22] Filed: Dec. 14, 1982

[30] Foreign Application Priority Data

Mar. 15, 1982 [JP] Japan .................. 57-43556
Mar. 15, 1982 [JP] Japan .................. 57-43558

[51] Int. Cl.³ .............................................. G01F 1/32
[52] U.S. Cl. ......................................................... 73/204
[58] Field of Search ........................... 73/204, 861.22

[56] References Cited

U.S. PATENT DOCUMENTS

| | | | |
|---|---|---|---|
| 3,564,915 | 2/1971 | Tomota et al. | 73/861.22 |
| 3,587,312 | 6/1971 | McMurtrie | 73/861.22 |
| 4,320,650 | 3/1982 | Kita | 73/861.22 X |
| 4,386,520 | 6/1982 | Nagaishi | 73/861.22 X |

Primary Examiner—Herbert Goldstein
Attorney, Agent, or Firm—Bernard, Rothwell & Brown

[57] ABSTRACT

An apparatus for measuring the flow velocity by detecting the number of Von Karman's vortex streets or Strouhl vortexes by utilizing heating wires, said apparatus comprising a vortex generator disposed in a fluid to be measured, at least one heat-sensitive element which detects the flow velocity or flow rate of the fluid in the form of change of temperature caused by said vortex generator, and which produces detection signals that represent change in frequency of the electric signals, an operational amplifier for amplifying the detection signals, and a feedback circuit which feeds the output of said operational amplifier back to said heat-sensitive element such that its temperature is maintained substantially constant, and such that the preset temperature of said heat-sensitive element changes in response to the output of said operational amplifier, whereby the frequency characteristics thereof are improved and the apparatus can be stably started under any conditions.

5 Claims, 16 Drawing Figures

WHEN VOS IS SMALLER THAN 0

APPARATUS FOR MEASURING FLOW VELOCITY

BACKGROUND OF THE INVENTION

1. Field of the Invention

The present invention relates to an apparatus for measuring the flow velocity or the flow rate by detecting the number of vortexes that are formed. More specifically, the invention relates to an apparatus for measuring the flow velocity by detecting the number of Von Karman's vortex streets or Strouhl vortexes by utilizing heating wires.

2. Description of the Prior Art

A conventional device of this type has been disclosed in Japanese Utility Model Publication No. 14448/1973. According to this device, heating wires are running through the holes formed in poles that constitute a vortex generator, and the number of vortexes are detected relying upon the heating wires. With the device in which bare heating wires are disposed in the fluid to detect analog change in temperature of the heating wires, however, the sensitivity for detecting the change of vortexes undergoes variation depending upon the change in the flow velocity, and deteriorates frequency characteristics.

Further, in the case when a pair of bare heating wires are provided at the back of the vortex generator, the two heating wires being so controlled as to maintain constant temperatures respectively, in order to detect vortex signals relying upon the difference in the control signals of the heating wires, difference develops in the detected signals depending upon the characteristics of the operational amplifiers employed for the heating wires, and makes it difficult to stably detect the signals.

Moreover, variance in the operational amplifiers often renders the device inoperative. In addition, if the temperature of the fluid to be measured changes, resistance of the heating wires changes, too, and the detection sensitivity varies.

SUMMARY OF THE INVENTION

The principal object of the present invention is to provide a useful apparatus for measuring the flow velocity, which is free of the above-mentioned defects.

Another object of the present invention is to provide an apparatus for measuring the flow velocity, in which offset voltages are given to inputs of the operational amplifiers of a constant-temperature control circuit to improve the frequency characteristics, and which can be stably started under any conditions.

A further object of the present invention is to provide an apparatus for measuring the flow velocity, which is so improved that no difference develops in the detection sensitivity when vortex signals are to be detected using two heat-sensitive elements.

Still further objects and features of the invention will become obvious from the following description of embodiments in conjunction with the accompanying drawings.

DESCRIPTION OF A PREFERRED EMBODIMENT

Figure 1A:
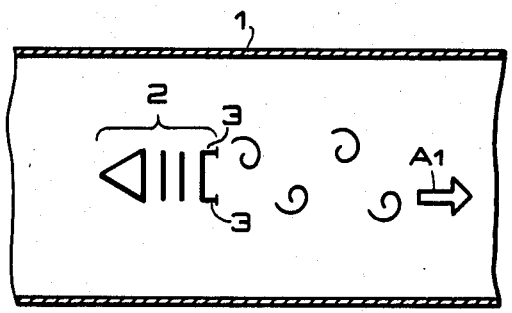
FIG. 1A is a diagram illustrating a vortex generator and heating wires in a tube employed in the apparatus for measuring the flow velocity according to the present invention.
Figure 1B:
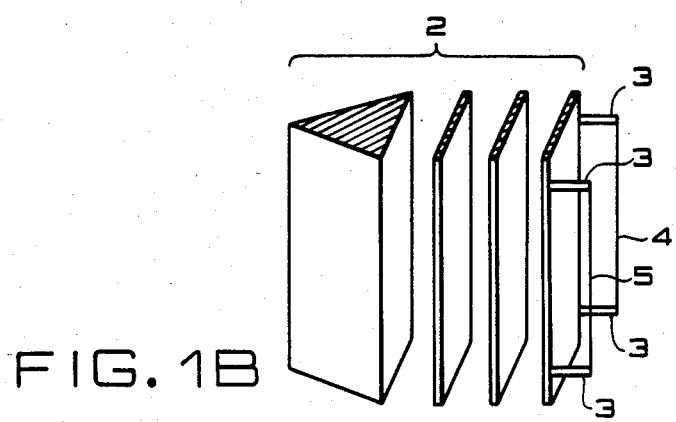
FIG. 1B is a perspective view showing, on an enlarged scale, the vortex generator and heating wires of FIG. 1A.

FIG. 1A is a diagram showing a tube and a vortex generator according to an embodiment of the present invention, and FIG. 1B is a perspective view showing, on an enlarged scale, the vortex generator of FIG. 1A. In FIGS. 1A and 1B, reference numeral 1 denotes a tube, 2 depicts a vortex generator, and 3 illustrates poles for supporting the heating wires 4 and 5. Von Karman's vortex streets are formed regularly at the back of the thus constructed vortex generator, and the heating wires 4, 5 are regularly and alternatively cooled by the right and left vortex streets. In FIG. 1A, the fluid is flowing in the direction of arrow $A_1$.

Figure 2:
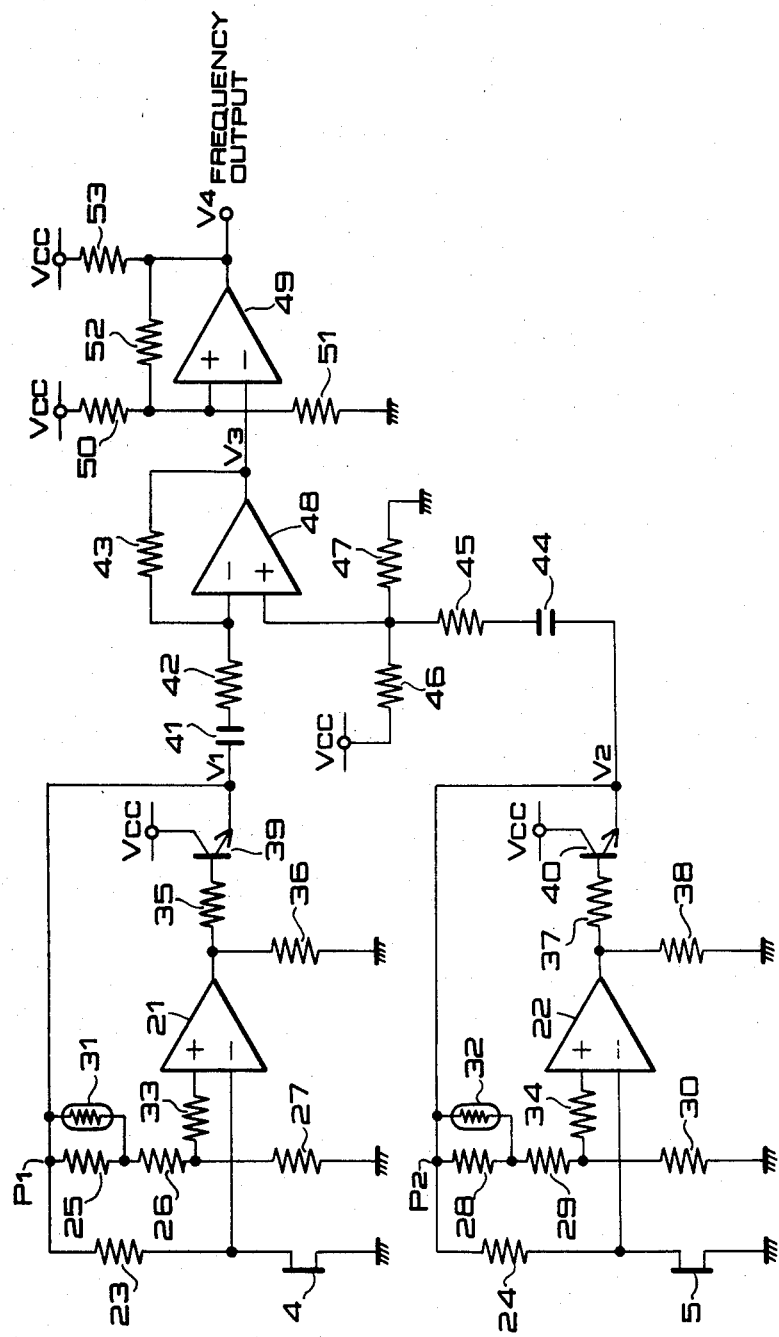
FIG. 2 is a circuit diagram illustrating the setup of the apparatus for measuring the flow velocity according to an embodiment of the present invention.

FIG. 2 is a diagram of electric circuit of the apparatus for measuring the velocity of fluid according to the present invention. Ends on one side of the heating wires 4, 5 shown in FIG. 1B are grounded. The other end of the heating wire 4 is connected to an inverted input terminal of an operational amplifier 21, and is further connected via a resistor 23 to the emitter of a transistor 39. A connection point $P_1$ between the emitter and the resistor 23 is grounded via resistors 25 to 27, and a thermistor 31 is connected in parallel with the resistor 25. Further, a connection point between the resistor 26 and the resistor 27 is connected to a non-inverting input terminal of the operational amplifier 21 via a resistor 33. Output terminal of the operational amplifier 21 is grounded via a resistor 36, and is further connected to the base of the transistor 39 via a resistor 35. A voltage $V_{CC}$ is applied to the collector of the transistor 39.

Thus, a bridge circuit is constructed relying upon the heating wire 4, resistors 23, 25, 26, 27, and thermistor 31, to so control the heating wire 4 that its temperature is maintaind constant. A feedback circuit is also constructed based upon the resistors 33, 35, 36, operational amplifier 21, and transistor 39. The transistor 39 produces through its emitter a detection output $V_1$ of the heating wire 4 which is cooled by the Von Karman's vortex street.

The detection output $V_1$ is further sent to an inverting input terminal of an operational amplifier 48 via a capacitor 41 and a resistor 42. A resistor is connected across the output terminal and the inverting input terminal of the operational amplifier 48.

Similarly, the other end of the heating wire 5 is connected to the emitter of a transistor 40 via a resistor 24. A connection point $P_2$ between the emitter and the resistor 24 is grounded via resistors 28 to 30, and a thermistor 32 is connected in parallel with the resistor 28. A connection point between the resistor 29 and the resistor 30 is connected via a resistor 34 to a non-inverting input terminal of an operational amplifier 22. Further, the inverting input terminal of the operational amplifier 22 is connected to the other end of the heating wire 5. The output terminal of the operational amplifier 22 is grounded via a resistor 38, and is further connected to the base of a transistor 40 via a resistor 37. The voltage $V_{CC}$ is applied to the collector of the transistor 40.

Thus, a bridge circuit is constructed relying upon the heating wire 5, resistors 24, 28, 29, 30, and thermistor 32 to so control the heating wire 5 that its temperature is maintained constant. Further, a feedback circuit is constructed relying upon the resistors 34, 37, 38, transistor 40, and operational amplifier 22. The detection output $V_2$ of the heating wire 5 appears on the emitter of the transistor 40. The detection output $V_2$ is sent to the non-inverting input terminal of the operational amplifier 48 via a capacitor 44 and a resistor 45. The non-inverting input terminal of the operational amplifier 48 is served with the voltage $V_{CC}$ via a resistor 46, and is further grounded via a resistor 47.

The capacitors 41, 44, resistors 42, 43, 45 to 47, and operational amplifier 48, work to lead only the detection output $V_3$ of Von Karman's vortex street contained in the detection outputs $V_1$, $V_2$ which are produced by the transistors 39, 40, and amplify the output $V_3$ to send it to an inverting input terminal of a voltage comparator 49. That is, the output terminal of the operational amplifier 48 is connected to the inverting input terminal of the voltage comparator 49 of which the non-inverting input terminal is connected to a connection point between a resistor 50 and a resistor 51. A series circuit consisting of resistors 50 and 51 is connected across the power supply $V_{CC}$ and ground. A resistor 52 is connected across the output terminal and the non-inverting input terminal of the voltage comparator 49, the output terminal of the voltage comparator 49 is served with the voltage $V_{CC}$ via a resistor 53, and further produces a frequency output $V_4$.

The circuit consisting of resistors 50 to 53, and voltage comparator 49, works as a waveform shaping circuit which converts the detection outputs $V_3$ into pulse outputs $V_4$.

The thermistors 31, 32 constituting the bridge circuits detect the temperature of the fluid that is to be measured, and work to maintain the temperatures of the heating wires 4, 5 at suitable values depending upon the temperature of the fluid.

Below is mentioned the operation of the electric circuit of the above-mentioned embodiment. The transistors consistuting the differential amplifiers of inputs of the operational amplifiers 21, 22 are those of the PNP type, such as upc 451C manufactured by Nippon Electric Co., Ltd. The resistors 25 to 30, 33 and 34 have resistances greater than those of the resistors 23, 24 and the heating wires 4, 5.

Due to the characteristics of the operational amplifiers 21, 22, therefore, the offset voltage produced by the bias current and applied to the non-inverting input terminal becomes necessarily greater than the voltage applied to the inverting input. This is described below in further detail with reference to the equivalent circuit of FIG. 3 and the graphs of operation points of FIG. 4.

Figure 3:
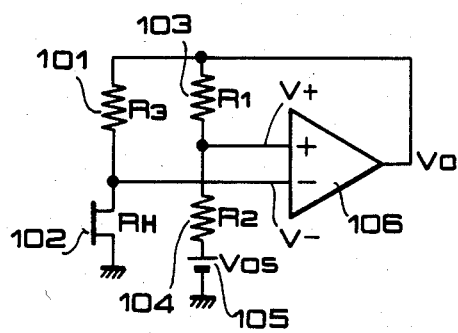
FIG. 3 is a diagram of an equivalent circuit which works to maintain constant the temperature of the heating wires in the apparatus of FIG. 2.

In FIG. 3, reference numeral 101 denotes a resistor having resistance $R_3$, 102 denotes a heating wire having resistance RH, 103 denotes a resistor having resistance $R_1$, 104 denotes a resistor having resistance $R_2$, and 106 denotes an operational circuit having input and output terminal voltages $V+$, $V-$ and $V_O$. Reference numeral 105 depicts an offset voltage $V_{OS}$ between the terminal voltage $V+$ and the terminal voltage $V-$.

In this case, the input terminal voltage $V-$ is given by, $$V+ = V_{OS} + \frac{R_2}{R_1 + R_2}(V_O - V_{OS}) = \frac{R_2}{R_1 + R_2} V_O + \frac{R_1}{R_1 + R_2} V_{OS}$$

The input terminal voltage $V-$ is given by, $$V- = \frac{RH}{R_3 + RH} V_O$$

Under steady state, a relation,
$V+ = V- (3)$
holds true.

Figure 4A:
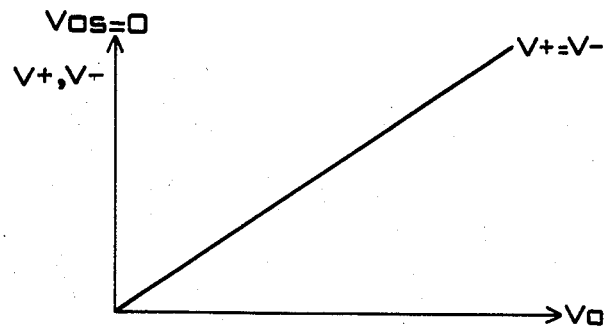
FIGS. 4A to 4C are graphs showing relations between the output voltage and the input voltages of an operational amplifier in the equivalent circuit of FIG. 3.
Figure 4B:
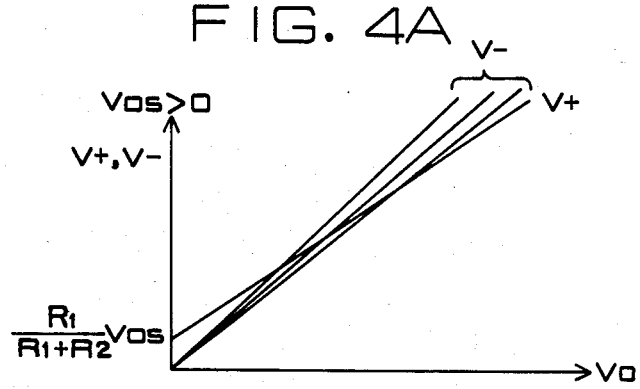
Figure 4C:
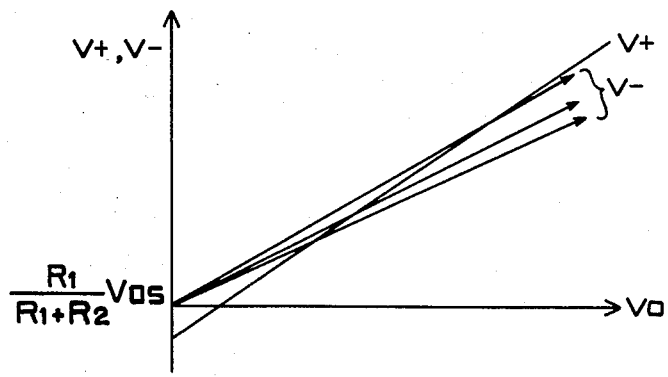

FIGS. 4A to 4C illustrate the above-mentioned relation, and the relation between $V_{OS}$ and $V_O$. When $V_{OS}=0$ in FIG. 4A, $V-$ and $V-$ remain constant always; this relation should be maintained at all times when the flow velocity is to be measured relying upon the heating wires. In equations (1), (2) and (3), $R_1$, $R_2$ and $R_3$ are constant so that the inclination of the straight line $V+$ against the line Vo is $$\frac{R_2}{R_1 + R_2} \text{ (constant value).}$$

Further the cross point $$\frac{R_1}{R_1 + R_2} V_{OS}$$

of the ordinate of the straight line $V-$ is proportional to $V_{OS}$ since $R_1/(R_1+R_2)$ is constant. Since RH is a resistance of the heating wire, rise of the voltage applied to the heating wire results in rise of the temperature of the heating wire so that RH becomes large and as the result, the inclination $RH/(R_3+R_H)$ of the line $V-$ becomes large. On the contrary, drop of the voltage applied to the heating wire results in drop of the temperature of the heating wire so that RH becomes small and as the result, the inclination $RH/(R_3+RH)$ of the line $V-$ becomes small.

However, the offset voltage $V_{OS}$ which is brought close to zero, may often become smaller than zero as shown in FIG. 4C. If the output voltage $V_O$ becomes zero, the input voltage $V-$ becomes greater than the input voltage $V+$, and the circuit does not operate. In order for the circuit to stably operate, therefore, the offset voltage must be equal to, or greater than, zero.

Further, when $V_{OS}>0$ as shown in FIG. 4B, the input voltage $V+$ becomes equal to the input voltage $V-$ as the output voltage $V_O$ increases. Therefore, the gradient of input voltage $V-$ decreases. This means that the resistance RH of the heating wire 102 must be reduced, i.e., temperature of the heating wire must be slightly decreased with the increase in the terminal voltage $V_O$, making it possible to prevent dynamic characteristics from being deteriorated by delay in response of the heating wires or by the delay in response of the operational amplifiers.

This effect appears as difference of outputs when the flow velocity is measured relying upon the heating wires in a customary manner, but turns out to be a great advantage for improving frequency characteristics when AC components are to be detected relying upon vortex signals.

In the circuit of the embodiment of FIG. 2, the offset voltage $V_{OS}$ is set chiefly by the resistors 33, 34 and by input bias currents of the operational amplifiers 21, 22. Accordingly, no freedom is provided for the offset voltage $V_{OS}$. Further, as will be obvious from the graphs of FIGS. 4A to 4C, the effect of offset voltage $V_{OS}$ appears distinguishedly when the output voltage $V_O$ is small; the effect decreases with the increase in the output voltage $V_O$.

Figure 5:
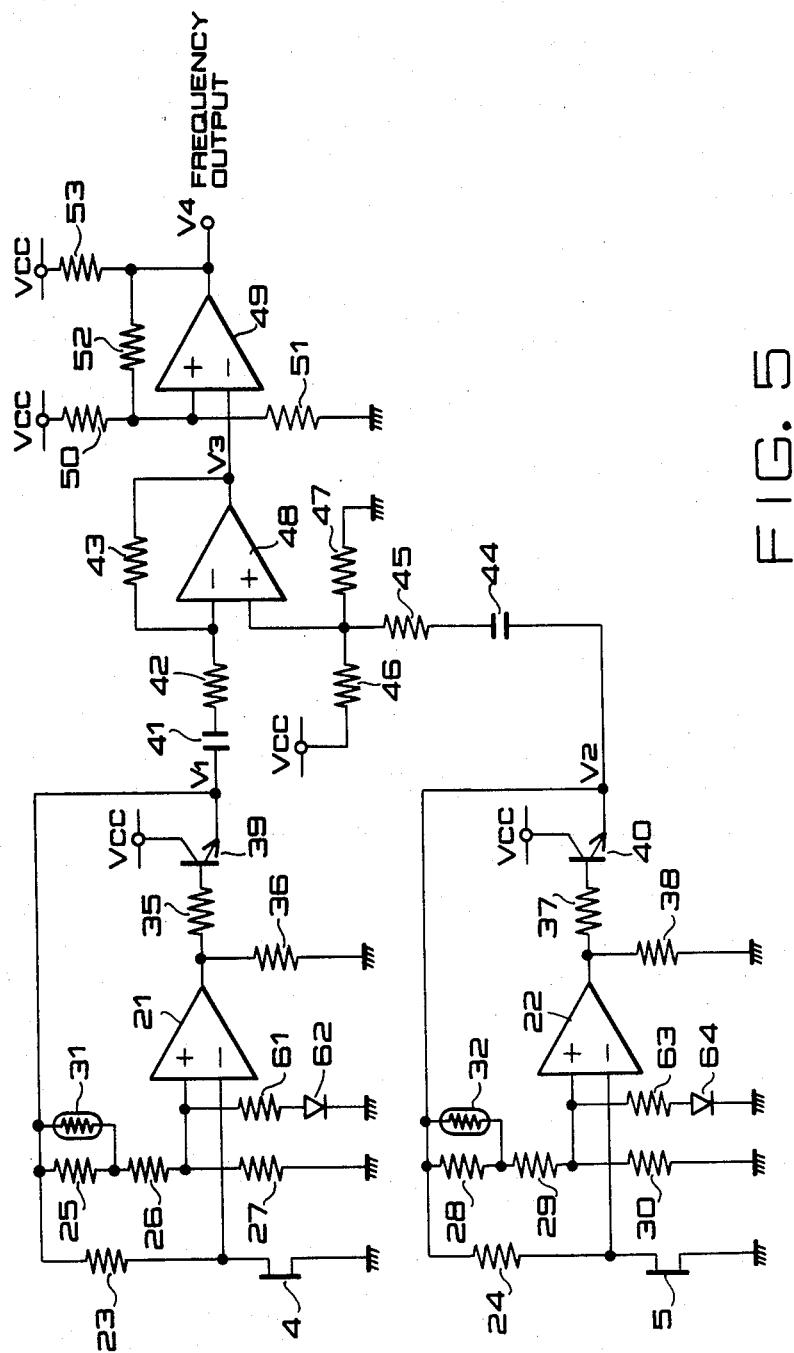
FIG. 5 is a circuit diagram showing the apparatus for measuring the flow velocity according to another embodiment of the present invention.

FIG. 5 is a circuit diagram according to another embodiment of the present invention, which is improved from the embodiment of FIG. 2. In FIG. 5, non-inverting input terminals of the operational amplifiers 21, 22 are grounded via a series circuit consisting of a resistor 61 and a diode 62, and via a series circuit consisting of a resistor 63 and a diode 64, respectively. Other setups are the same as those of FIG. 2.

In this setup, the offset voltage when $V_O=0$ (i.e., when $V_1=0$, $V_2=0$) is determined by the resistor 23, heating wire 4, resistors 25 to 27, and resistance of the thermistor 31, and is so set that $V_{OS}\geqq 0$ in the equivalent circuit of FIG. 3.

The effects of resistors 61, 63 and diodes 62, 64 appear as the output voltage $V_O$ (i.e., $V_1$ and $V_2$) becomes greater than the voltage drop through diodes 63, 64 in the forward direction. If constant-voltage elements having any voltage value are used instead of diodes 62, 64, temperatures of the heating wires can be programmed arbitrarily relative to the output voltage $V_O$.

It needs not be pointed out that the same effects can be expected if the same method is applied to other side of the bridge circuit. Further, the circuits may be formed in a plurality of numbers to set a complex function approximate to a multiple polygonal line.

The thermistors 31, 32 of FIGS. 2 and 5 work to detect the temperature of the fluid that is to be measured; the sensitivity for producing detection output $V_3$ does not greatly change even if the temperature of the fluid is changed.

In the embodiments illustrated in FIGS. 2 and 5, the heating wires are connected between the non-inverting input terminals of the operational amplifiers and ground terminals. The same effects, however, can be obtained even if the heating wires are shifted to other sides such that the conditions of feedback circuits will hold.

The heating wires 4, 5 may be other heat-sensitive elements such as thermistors or posistors, and thermistors 31, 32 may be other heat-sensitive elements such as heating wires, thermistors, or posistors.

Although the above embodiments have dealt with flow meters of the type of Von Karman's vortex street by using two heating wires, it should be noted that the invention can also be adapted to flow meters of the type of Strouhl vortex.

Figure 6:
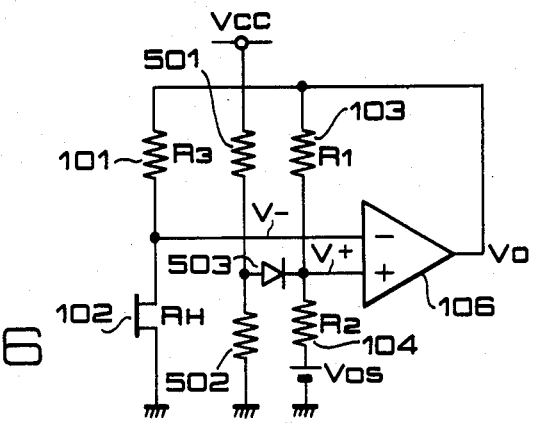
FIG. 6 is a circuit diagram illustrating the fundamental setup of the apparatus according to a further embodiment of the present invention.

FIG. 6 is a circuit diagram illustrating a fundamental setup employing the heating wires used in the vortex generator 2 of FIGS. 1A, 1B, according to a still further embodiment of the present invention. In FIG. 6, the same portions as those of FIG. 3 are denoted by the same reference numerals, and the newly added portions only are described below. Reference numerals 501 and 502 denote resistors, and 503 denotes a diode which is connected between the non-inverting input terminal of the operational amplifier 106 and a connection point of the resistors 501, 502. The resistors 501, 502 form a series circuit of which the one end is served with the voltage $V_{CC}$ and the other end is grounded.

In FIG. 6, if the offset voltage $V_{OS}$ is smaller than zero, the input voltage $V-$ becomes greater than the input voltage $V+$ when the power supply is closed, i.e., when $V_O\cong 0$, and the circuit does not work. Owing to the effects of the resistors 501, 502, and diode, however, the input voltage $V+$ is so raised as to offset the state $V_{OS}<0$, whereby the relation $V-<V+$ is held.

Figure 7:
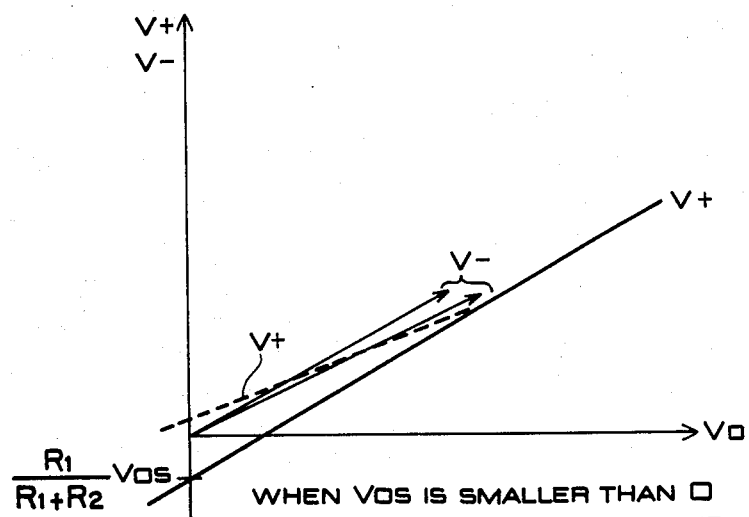
FIG. 7 is a graph showing functional relations of voltages $V+$ and $V-$ relative to the output voltage $V_O$ of FIG. 6.

FIG. 7 shows functional relations of input voltages $V+$ and $V-$ relative to the output voltage $V_O$ of FIG. 6. It will be understood that the gradient of input voltage $V+$ is raised as indicated by a dotted line until the diode 503 is reversely biased, so that the offset voltage $V_{OS}$ is equal to, or greater than, zero. Namely, the additional circuit of FIG. 6 exhibits its effect.

Therefore, the circuit can be stably started in any cases. Depending upon the voltage $V_{CC}$ at the connection point of resistor 501 of FIG. 6, furthermore, the same effect can be obtained if the input voltage $V+$ is pulled up utilizing the resistor 501 only.

Next, even when $V_{OS}\geqq 0$, the detection sensitivity varies depending upon the output voltage $V_O$ if the offset voltage $V_{OS}$ changes. This is represented by FIGS. 4A and 4B. In the case of FIG. 4A, the gradient $V-$ for maintaining $V+=V-$ remains constant at all times irrespective of the output voltage $V_O$. With reference to FIG. 4B, on the other hand, the gradient $V-$ for maintaining $V+=V-$ decreases with the increase in the output voltage $V_O$.

The inventors have found through experiments the fact that the sensitivity for detecting vortex signals can be maintained most stably when the gradient $V-$ for maintaining $V+=V-$ gradually decreases with the increase in the output voltage $V_O$. It has been known that the detectable frequency range is narrowed when the gradient $V-$ decreases or increases extremely.

Figure 8:
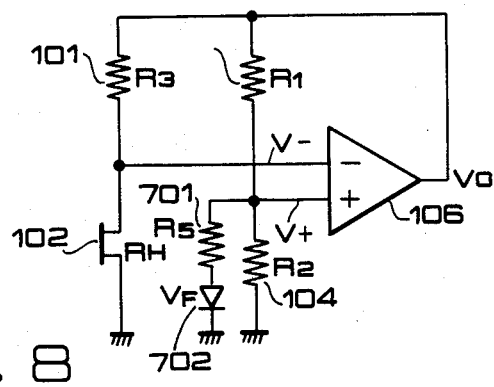
FIG. 8 is a diagram of fundamental setup of the apparatus according to still further embodiment of the present invention.

FIG. 8 is a diagram showing a fundamental setup according to yet further embodiment of the present invention, in which reference numeral 701 denotes a resistor having resistance $R_5$, and 702 denotes a diode having a voltage $V_F$ in the forward direction. The non-inverting input terminal of the operational amplifier 106 is grounded via a series circuit consisting of the resistor 701 and the diode 702, in addition to the resistor 104 of the circuit of FIG. 3.

Figure 9:
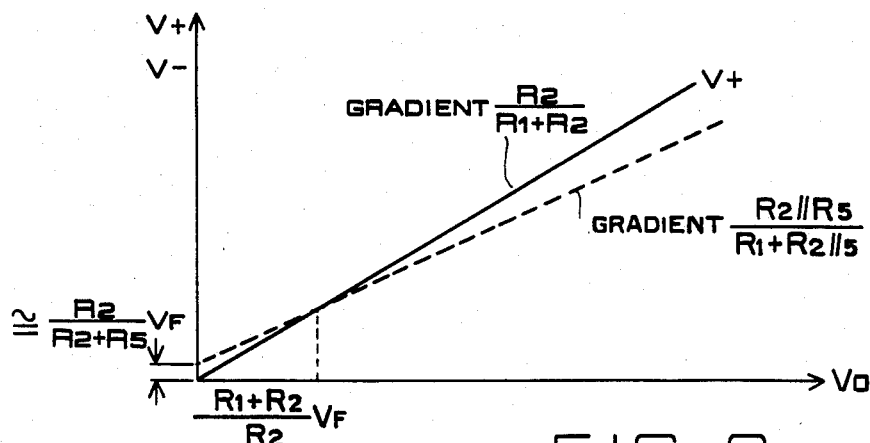
FIG. 9 is a graph showing functional relations of voltages $V+$ and $V-$ relative to the output voltage $V_O$ of FIG. 8.

In this case, when the output voltage $V_O$ is smaller than $$\frac{R_1 + R_2}{R_2} V_F$$

of the diode 702, the functional relation of the input voltage $V+$ to the output voltage $V_O$ is given by $$V+ = \frac{R_2}{R_1 + R_2} V_O$$

as shown in FIG. 9. When $V_O$ is greater than $$\frac{R_1 + R_2}{R_2} V_F$$

the functional relation of $V+$ to $V_O$ is given by $$V+ = \frac{R_2 // R_5}{R_1 + R_2 // R_5} V_O + \frac{R_2}{R_2 + R_5} V_F$$

This can be set to be equal to the offset voltage $$V_{OS} = \frac{R_2}{R_2 + R_5} V_F$$

In FIG. 9, the corrected voltage $V+$ changes as indicated by a solid line when $V_O < V_F$ and changes as indicated by a dotted line when $V_O \geq V_F$.

By adjusting the voltage $V_F$ or the resistance $R_5$, offset voltage of the operational amplifier 106 or any other variance can be corrected arbitrarily. When the heating wires are stretched on the right and left sides in parallel, therefore, the detection signals produced by the right and left heating wires can be arbitrarily adjusted to cancel imbalance.

Figure 10A:
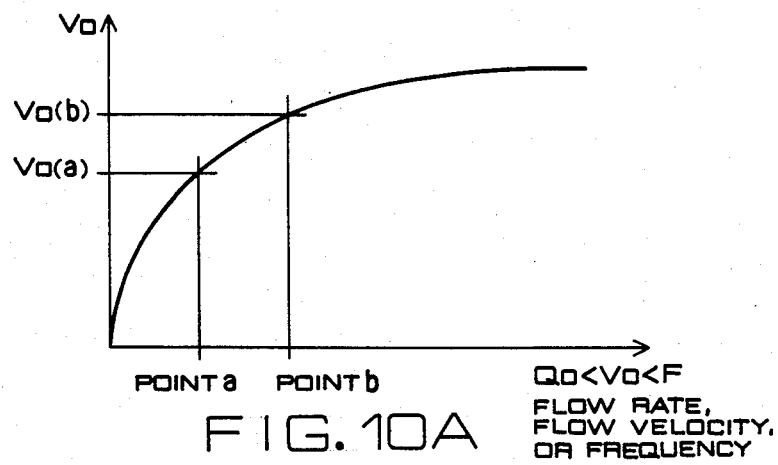
FIG. 10A is a graph showing a relation of average value of flow rate, flow velocity or vortex frequency relative to the output voltage, when vortex signals are detected using a fundamental circuit that is adjusted as shown in FIGS. 8 and 9.
Figure 10B:
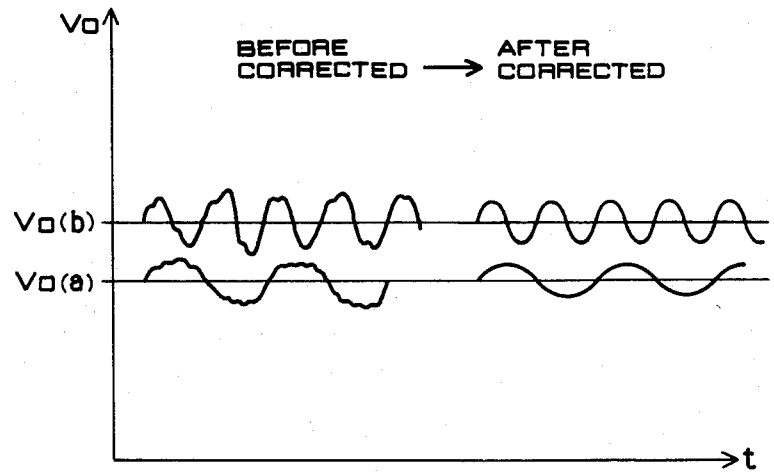
FIG. 10B is a diagram illustrating the detection of vortex signals at points a and b in FIG. 10A.

FIG. 10 shows an output waveform when vortex signals are detected using a fundamental circuit which is adjusted as illustrated in FIGS. 8 and 9. FIG. 10A demonstrates average values $\overline{V}_O$ of flow rate vs. output voltage $V_O$. In this case, the flow rate represented by the abscissa may be the flow velocity, or may be a vortex frequency F. The average value $\overline{V}_O$ represented by the ordinate usually corresponds to the output of the flow meter of the type of heating wire, and is given by a King's formula. FIG. 10B illustrates detection of vortex signals at points a and b in FIG. 10A. The flow rate at a point a and a point b is about 1 to 2.

When the offset voltage $V_{OS}$ does not assume a proper value as mentioned earlier, amplitude of the vortex signals becomes unstable; i.e., vortex signals contain harmonic components and are distorted. This phenomenon develops when $V_{OS} \leq 0$. Flow rate characteristics (frequency characteristics) of amplitude and distortion of waveform are improved by effecting the correction as shown in FIGS. 6 and 8.

Figure 11:
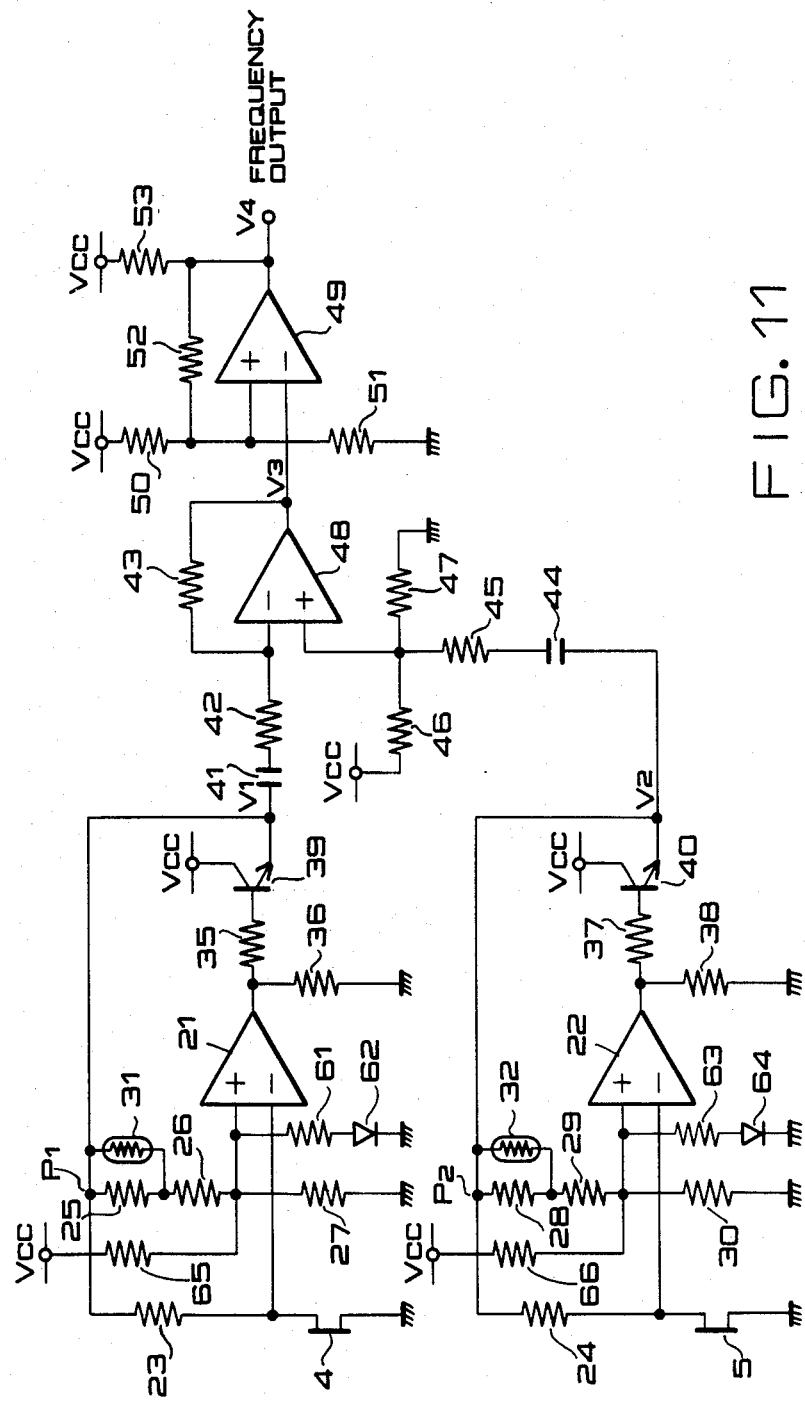
FIGS. 11 and 12 are diagrams of the electric circuits of the apparatus according to yet further embodiments of the present invention.

FIG. 11 is a diagram showing the whole electric circuit according to another embodiment of the present invention, and which corresponds to FIG. 2. In FIG. 11, the same portions as those of FIG. 2 are denoted by the same reference numerals. Only those portions which are different from FIG. 2 will be described below.

In FIG. 11 as will be obvious from FIGS. 6 and 8, the non-inverting input terminals of the operational amplifiers 21, 22 are different from those of FIG. 2. That is, in the circuit of FIG. 11, the non-inverting input terminal of the operational amplifier 21 is grounded via a series circuit consisting of a resistor 61 and a diode 62, in addition to the resistor 27 of FIG. 2, and is further served with the voltage $V_{CC}$ via a resistor 65.

Similarly, the non-inverting input terminal of the operational amplifier 22 is grounded via a series circuit consisting of a resistor 63 and a diode 64, and is served with the voltage $V_{CC}$ via a resistor 66.

Accordingly, the non-inverting input terminals of the bridge circuits are forcibly served with a positive offset voltage $V_{OS} \geq 0$ through resistors 65, 66. Offset voltages of the operational amplifiers and other imbalance components will be added to the non-inverting input terminals. In this case, the added components may differ depending upon the bridge circuit on the side of the heating wire 4 and the bridge circuit on the side of the heating wire 5.

The individual bridge circuits can be easily started. However, since the applied voltages are not equal, difference develops in the detection sensitivities corresponding to flow rates (i.e., vortex frequencies) represented by the detection outputs $V_1$ and $V_2$. This difference can be easily offset by adjusting resistance of the resistor 61 or 63.

Figure 12:
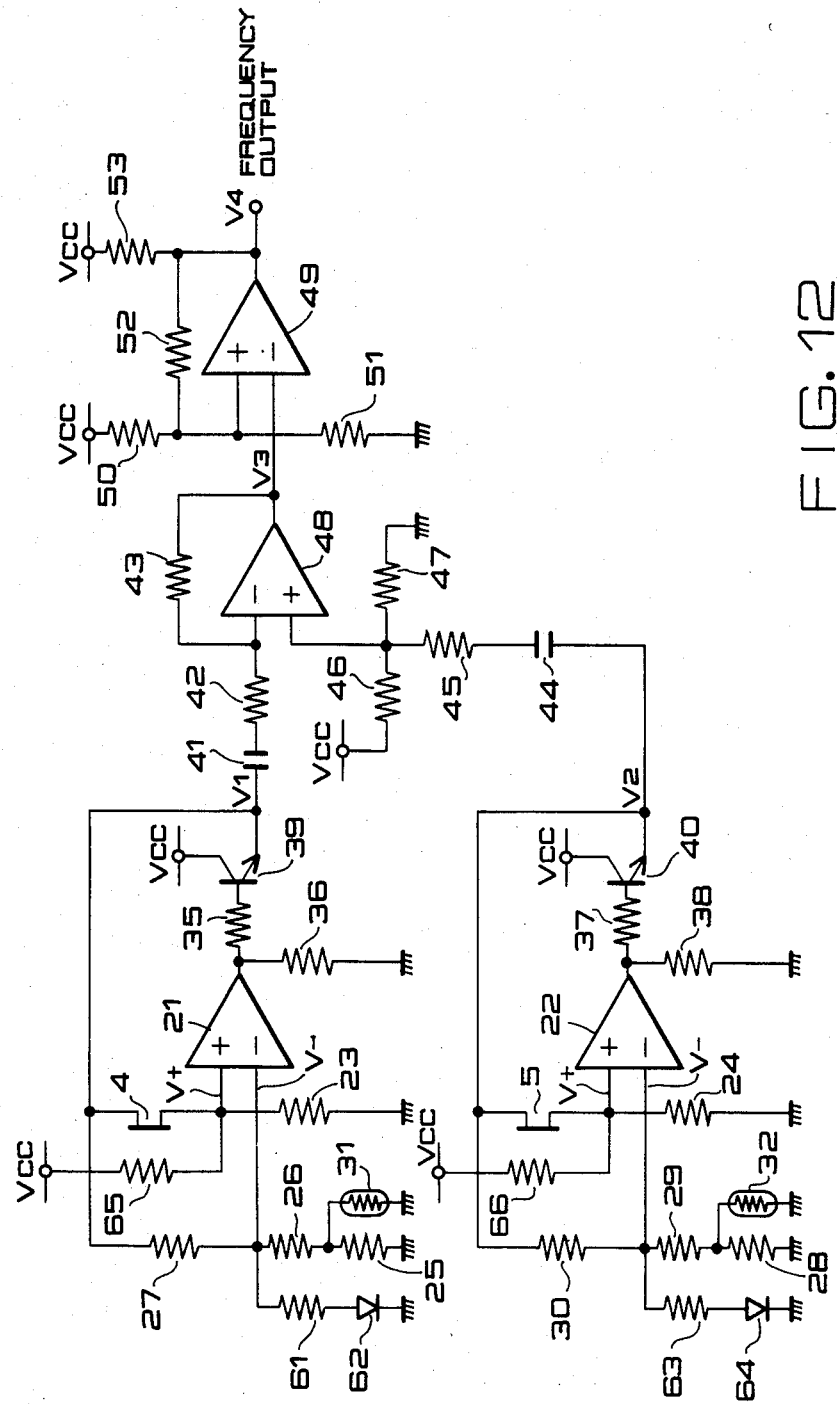

FIG. 12 is a circuit diagram according to yet further embodiment of the present invention. What makes this embodiment different from the embodiment of FIG. 11 is that connection points of bridge circuits including heating wires 4, 5 are connected to the non-inverting input terminals of the operational amplifiers 21, 22.

That is, the resistors 65 and 66 are provided to apply offset voltages of positive polarity, so that the circuit will reliably start the operation when the power supply is closed. The resistors 65, 66 further work to maintain balance between the output voltages $V_1$ and $V_2$, and to maintain stability. With the resistors 65, 66 only, however, offset voltages and other effects can be corrected from one side only. Correction in the reverse direction is effected by resistors 61, 63 and diodes 62, 64.

By these means, imbalance between the output $V_1$ and the output $V_2$ can be easily adjusted.

These effects and the principle for countermeasures can be easily understood if characteristics graphs are described concerning $V+$ and $V-$ relative to $V_O$. The same effects can be expected no matter how many places, or no matter which side of bridge circuit, the offset voltage is applied. More good results will be obtained if the applied voltages are finely controlled responsive to the output voltage $V_O$.

Further, the heating wires may be replaced by thermistors, posistors, diodes, transistors, or by any other heat-sensitive elements.

The above-mentioned embodiments have dealt with flow meters of the type of Von Karman's vortex street employing two heating wires. It should, however, be noted that the same effects are exhibited even when only one heating wire is employed, or even when the invention is adapted to the flow meter of the type of Strouhl vortex.

According to the apparatus for measuring the flow velocity of the present invention as mentioned above, outputs of heat-sensitive elements such as heating wires are supplied to operational amplifiers to maintain the temperatures of the heating wires nearly constant, outputs of the operational amplifiers are fed back to the heat-sensitive elements, and a desired offset voltage is applied across the two input terminals of the operational amplifiers depending upon the outputs of the operational amplifiers. Therefore, the starting operation of the circuit and stability of operation can be improved remarkably.

Further, in detecting Von Karman's vortex street relying upon difference signals of the two heating wires, any variance in the offset voltages and frequency characteristics of the two operational amplifiers can be easily cancelled independently of each other to improve frequency characteristics.

Even when the operational amplifiers are not furnished with a function for adjusting the offset voltage, it can be set at a stage of external input terminals. Namely, a desired function can be realized using cheaply available general-purpose elements.

Moreover, the detection sensitivity for vortex is not affected even when the temperature of the fluid being measured is changed. In other words, the detecting sensitivity can be maintained in an optimum range.

What is claimed is:

1. An apparatus for measuring flow velocity comprising:
    (a) a vortex generator disposed in a fluid to be measured;
    (b) at least one heat-sensitive element disposed in the fluid for detecting the flow velocity or flow rate of the fluid in the form of change of fluid caused by said vortex generator and producing detection signals representative of a change in frequency of electric signals, said heat-sensitive element comprising a heating wire;
    (c) an operational amplifier for amplifying the detection signals;
    (d) a bridge circuit comprising a circuit network including said heating wire as one side thereof;
    (e) the output of said operational amplifier being fed back to said bridge circuit.
    (f) means including a feedback circuit for feeding the output of said operational amplifier back to said heat-sensitive element for changing the temperature of said heat-sensitive element in response to the output of said operational amplifier; and
    (g) means for applying an offset voltage to at least one side of said bridge circuit.

2. An apparatus for measuring the flow velocity according to 1, wherein at least one side of said bridge circuit consists of a circuit network that includes said heat-sensitive element which is so disposed as to detect the temperature of the fluid, and means for changing the temperature of said heat-sensitive element depending upon the temperature of the fluid that is to be measured to maintain the difference in temperature between the fluid and the heat sensitive element substantially constant.

3. An apparatus for measuring the flow velocity according to 1, and further including means for changing the intensity of said offset voltage depending upon the output of said operational amplifier.

4. An apparatus for measuring the flow velocity according to claim 1, wherein the heat-sensitive element for detecting the change of vortex is directly disposed in the flow of fluid to be measured.

5. An apparatus for measuring the flow velocity comprising:
    (a) a vortex generator disposed in a fluid to be measured;
    (b) at least one heat-sensitive element disposed in the fluid for detecting the flow velocity or flow rate of the fluid in the form of change of fluid caused by said vortex generator, and producing detection signals that represent change in frequency of electric signals;
    (c) a bridge circuit which includes the heat-sensitive element in one side thereof;
    (d) an operational amplifier having an inverting input terminal and a non-inverting input terminal to which unbalanced voltage of the bridge circuit is applied;
    (e) means for feeding the output of the operational amplifier back to said bridge circuit to maintain the temperature of said heat-sensitive element substantially constant, said heat-sensitive element detecting change in frequency corresponding to the number of vortexes generated;
    (f) means for applying an offset voltage across the inverting input terminal and the non-inverting input terminal of said operational amplifier for causing said bridge circuit to start the operation even when the output of said operational amplifier is smaller than a predetermined voltage;
    (g) means for controlling the offset voltage to cause the output of said operational amplifier to assume a desired value for maintaining a balancing point of said bridge circuit at a desired value;
    (h) said heat-sensitive element comprising heating wires symmetrically arrayed on the right and left sides relative to the vortex generator; and
    (i) means for applying a desired offset voltage across the inverting input terminal and the non-inverting input terminal of the operational amplifier, in order to compensate variance in the characteristics of said right and left heating wires and in the characteristics of said operational amplifier.

* * * * *

UNITED STATES PATENT AND TRADEMARK OFFICE
CERTIFICATE OF CORRECTION

PATENT NO. : 4,497,203

DATED : February 5, 1985

INVENTOR(S) : Shunichi Wada

It is certified that error appears in the above-identified patent and that said Letters Patent is hereby corrected as shown below:

Column 4, line 41, "V+=V-(3)" should read

-- V+ = V-                             (3) --.

Signed and Sealed this

Sixth Day of August 1985

[SEAL]

*Attest:*

DONALD J. QUIGG

*Attesting Officer*      *Acting Commissioner of Patents and Trademarks*